US010284535B2

(12) United States Patent
Nachenberg

(10) Patent No.: US 10,284,535 B2
(45) Date of Patent: May 7, 2019

(54) SECURE DATABASE

(71) Applicant: Chronicle LLC, Mountain View, CA (US)

(72) Inventor: Carey Stover Nachenberg, Manhattan Beach, CA (US)

(73) Assignee: Chronicle LLC, Mountain View, CA (US)

( * ) Notice: Subject to any disclaimer, the term of this patent is extended or adjusted under 35 U.S.C. 154(b) by 206 days.

(21) Appl. No.: 15/376,786

(22) Filed: Dec. 13, 2016

(65) Prior Publication Data

US 2018/0165470 A1 Jun. 14, 2018

(51) Int. Cl.
G06F 21/62 (2013.01)
H04L 29/06 (2006.01)
G06F 21/74 (2013.01)
H04L 9/08 (2006.01)

(52) U.S. Cl.
CPC ........ H04L 63/061 (2013.01); G06F 21/6227 (2013.01); G06F 21/74 (2013.01); H04L 9/0897 (2013.01); H04L 63/0428 (2013.01)

(58) Field of Classification Search
CPC ............... G06F 21/6218; H04L 63/061; H04L 63/0428; H04L 9/008
See application file for complete search history.

(56) References Cited

U.S. PATENT DOCUMENTS 6,574,609 B1 6/2003 Downs et al.
6,789,195 B1 9/2004 Prihoda et al.
9,311,509 B2 4/2016 Casper et al.
9,424,432 B2* 8/2016 Holland ................. G06F 21/60
9,473,297 B2 10/2016 Glider et al.
9,747,456 B2* 8/2017 Arasu .................... G06F 21/602
9,887,836 B1* 2/2018 Roth ..................... H04L 9/0861
2001/0054142 A1* 12/2001 Van Blarkom ..... G06F 21/6254
713/151
2005/0044366 A1* 2/2005 Pucheral ........... G06F 17/30477
713/172

(Continued)

OTHER PUBLICATIONS

Sumeet Bajaj et al, TrustedDB: A Trusted Hardware-Based Database with Privacy and Data Confidentiality, IEEE (Year: 2014).*

(Continued)

Primary Examiner — Shanto Abedin
(74) Attorney, Agent, or Firm — Fish & Richardson P.C.

(57) ABSTRACT

Methods, systems, and apparatus, including a system that includes a secure hardware unit; and a database system including one or more processors; and a computer-readable medium having stored instructions that, when executed by the one or more processors, cause the one or more processors to perform operations including: receiving a client request to perform a database operation using first encrypted data as an encrypted value of a field to be operated on by the database operation, where the first encrypted data has been encrypted by a database client using a first encryption key; providing, to the secure hardware unit, a system request for performing one or more data processing operations, the system request including (i) the first encrypted data and (ii) data identifying the first encryption key; and receiving, from the secure hardware unit, output data representing an output of the one or more data processing operations.

19 Claims, 4 Drawing Sheets

(56) References Cited

U.S. PATENT DOCUMENTS

| | | |
|---|---|---|
| 2006/0288232 A1* | 12/2006 | Ho .................... G06F 21/6227 |
| | | 713/185 |
| 2007/0100913 A1 | 5/2007 | Sumner et al. |
| 2008/0059804 A1 | 3/2008 | Shah et al. |
| 2008/0189250 A1 | 8/2008 | Cha et al. |
| 2014/0281512 A1* | 9/2014 | Arasu .................. G06F 21/602 |
| | | 713/165 |
| 2016/0357979 A1 | 12/2016 | Paris et al. |

OTHER PUBLICATIONS

International Search Report and Written Opinion issued in International Application No. PCT/US2017/065696, dated Mar. 30, 2018, 12 pages.

Popa et al. "CryptDB: Protecting Confidentiality with Encrypted Query Processing," Proceedings of the Twenty-Third ACM Symposium on Operating Systems Principles, Oct. 23, 2011, pp. 85-100.

\* cited by examiner

SECURE DATABASE

BACKGROUND

This specification generally relates to a database service. A database client may submit a database operation to a remote database service to add records to a database, search records stored in a database, remove records from a database, or perform other operations on records in a database.

SUMMARY

According to one innovative aspect of the subject matter described in this specification, a secure database environment is provided, where input data, e.g., a value associated with a query field, is encrypted by a database client, and the encrypted input data is transmitted to a database system. The database system may store the encrypted input data as a database entry, but the database system cannot access the content of the encrypted input data to perform a database operation. To perform a database operation, the database system sends the encrypted input data and an identity of the encryption key to a secure hardware unit. The secure hardware unit retrieves the encryption key based on the specified identity and decrypts the encrypted input data using the retrieved encryption key. The secure hardware unit then performs certain data processing operations, e.g., logic operations, simple arithmetic, etc., on the decrypted input data as specified by the database system. The secure hardware unit then returns to the database system, output data that represents an output of the data processing operations.

In general, one innovative aspect of the subject matter described in this specification can be embodied in a system that includes a secure hardware unit; and a database system including one or more processors; and a computer-readable medium having stored thereon instructions that, when executed by the one or more processors, cause the one or more processors to perform operations comprising: receiving a client request to perform a database operation using first encrypted data as an encrypted value of a field to be operated on by the database operation, where the first encrypted data has been encrypted by a database client using a first encryption key; providing, to the secure hardware unit, a system request for performing one or more data processing operations, the system request including (i) the first encrypted data and (ii) data identifying the first encryption key; and receiving, from the secure hardware unit and by the database system, output data representing an output of the one or more data processing operations.

These and other implementations can each optionally include one or more of the following features. The operations may include determining that the database operation requires accessing one or more database entries in a database. In response to determining that the database operation requires accessing one or more database entries in the database, a database entry including second encrypted data that has been encrypted using a second encryption key may be obtained from the database, where the system request may include (iii) the second encrypted data and (iv) data identifying the second encryption key. The first encryption key and the second encryption key may be the same encryption key. The first encryption key and the second encryption key may be different encryption keys.

The secure hardware unit may include a key store that stores multiple encryption keys including the first encryption key; and circuitry or software to perform operations comprising: obtaining the first encryption key based on the data identifying the first encryption key; decrypting the first encrypted data using the first encryption key to generate first decrypted data; and performing the one or more data processing operations using the first decrypted data to generate the output of the one or more data processing operations. The operations may further include encrypting, using the first encryption key, the output of the one or more data processing operations to generate the output data; and providing the output data to the database system.

The operations may further include providing a response including the output data representing the output of the one or more data processing operations to the database client. The secure hardware unit may be a trusted platform module that is integrated with the one or more processors of the database system on a common board. The secure hardware unit may be integrated directly alongside a main processor of the database system.

To provide the system request for performing the one or more data processing operations to the secure hardware unit, it may be determined that the first encrypted data has been encrypted using the first encryption key. In response to determining that the first encrypted data has been encrypted using the first encryption key, the system request for performing the one or more data processing operations may be provided to the secure hardware unit.

The subject matter described in this specification can be implemented in particular embodiments so as to realize one or more of the following advantages. Data stored within a database system is encrypted at all times, including in random access memory (RAM), central processing unit (CPU) caches, and on-disk (e.g., within the databases indexes and records). An attacker with total control of the physical hardware or storage hosting the secure database cannot compromise the data within the database. In some cases, no special changes need to be made to the client's database schema to leverage the secure database. In some cases, no special changes need to be made to queries/inserts/updates sent to the database. The disclosure may remove the need for homomorphic encryption algorithms, yet still enable the database to operate on all of the encrypted data within the database as if it were not encrypted. By augmenting an existing database to use a secure hardware unit, a secure database may be enabled where the user's data is never exposed on the database system in plaintext form, yet the data can be indexed and queried just as data in any traditional database. In the event that an attacker steals the hard drive holding the database files, the user's data will be protected because it is encrypted. In the event that an attacker modifies the database system software, the data will still be protected because it is encrypted. In the event that an attacker gains access to the hypervisor or the kernel, even with memory inspection capabilities, the data will still be protected, because outside of the secure hardware unit, the database system does not process the decrypted data.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A database management system (DBMS) interacts with database clients, other applications, and the database itself to capture and analyze data. A DBMS allows the definition, creation, querying, update, and administration of databases. Database records may be stored in remote data centers or in a cloud-storage environment, and it may be desirable to protect unauthorized access of these database records by attackers. The proposed disclosure enables the storing, indexing, and processing of data within the database, within queries/updates to the database, and within responses from the database, in an encrypted form at all times. No data stored, indexed or processed by the DBMS may be visible or accessible in an unencrypted state, meaning that even if a cyber-attacker were to have total physical control over the hardware and software comprising the DBMS, the cyber-attacker would be unable to access the underlying data in a usable (e.g., unencrypted) form. To accomplish this objective, a database system is coupled with a secure hardware unit, akin to a Trusted Platform Module (TPM). The secure hardware unit is a tamper-proofed set of circuitry that has the ability to securely provision and hold one or more encryption keys, use them to decrypt encrypted data provided by the database, process the data, then possibly encrypt the result and output it back to the database software. The database therefore relies upon the tamper-proofed hardware unit to perform all operations on the data, so that no operations on unencrypted data are performed on the general-purpose computer system. The secure hardware unit may perform certain data processing operations, e.g., comparison operations, hashing, simple arithmetic, etc., on the input data as specified by the database system. The secure hardware unit is designed to hide its underlying encryption keys. Once a key has been provisioned into the hardware unit, it can be used to decrypt or encrypt data within the unit, but the unit prevents the key from being disclosed outside of the hardware module.

Figure 1A:
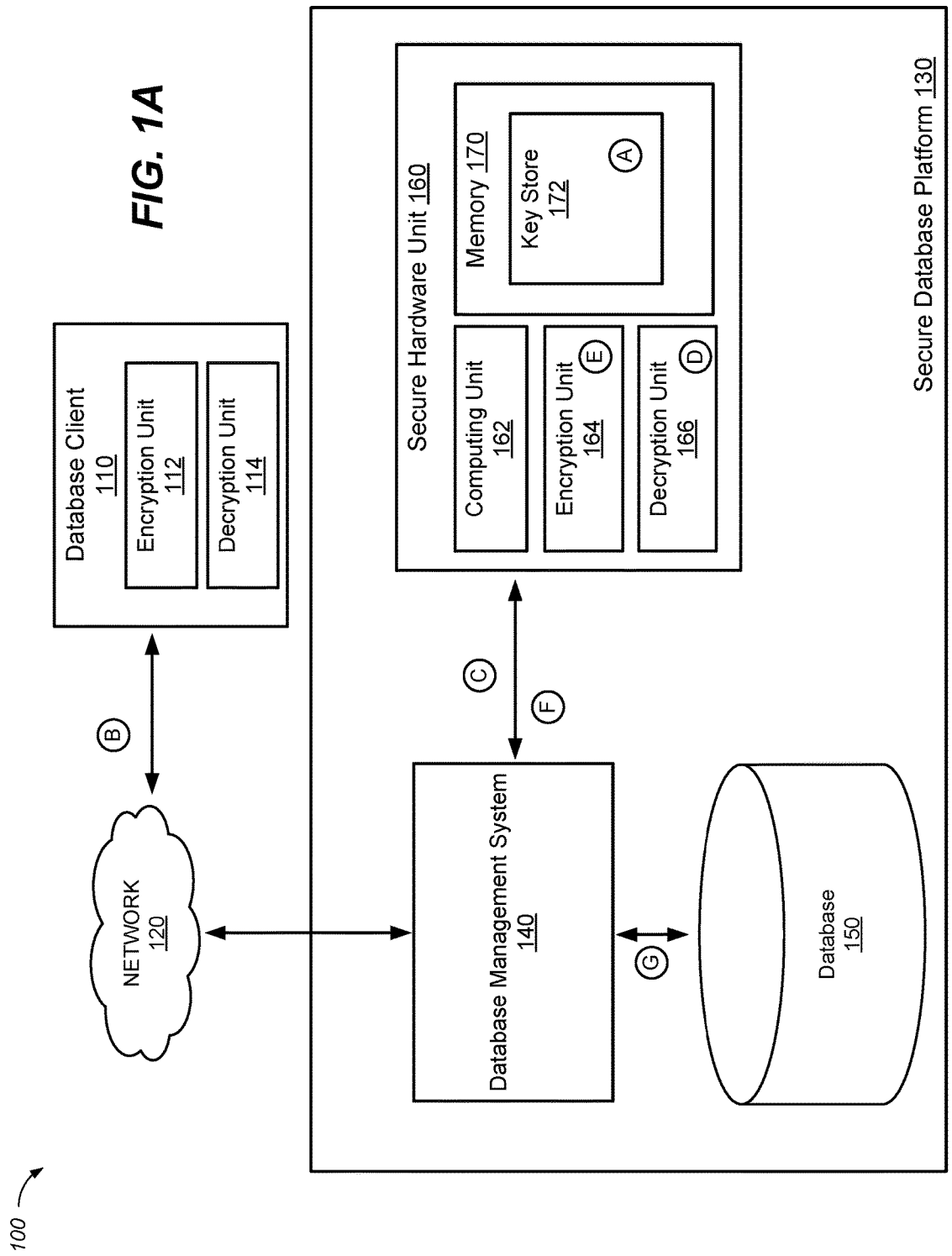
FIGS. 1A and 1B are block diagrams of an example data processing system.

FIG. 1A shows a block diagram of an example data processing system 100 for providing a secure database environment. In general, a secure database may be provided within a cloud-hosted service, where the database management system 140 does not store or process the database client's data in an unencrypted state. The data processing system 100 includes a database client 110, a network 120, and a secure database platform 130.

The database client 110 communicates with the secure database platform 130 to perform database operations. The database client 110 may be, for example, a server computer, a desktop computer, a laptop computer, a tablet computer, a wearable computer, a mobile computing device, or any other appropriate computing device that is configured to run a database application. A user of the database client 110 may operate the database client 110 directly, or indirectly through another device or system. The database client 110 includes an encryption unit 112 and a decryption unit 114.

The encryption unit 112 may be implemented as circuitry and/or logic and/or software and uses a client encryption key to encrypt one or more data values of a database operation. For example, to send a query to the secure database platform 130:

SELECT*from USERS where name=V1, where the value V1 of a database field "name" may be a plaintext string (e.g., "Bob"), the encryption unit 112 may use a client encryption key K1 to encrypt the value V1 to generate an encrypted value E1 (e.g., "345BA7890DE2640758C25949C5"). The database client 110 may then send the following input query to the secure database platform 130 for processing:

SELECT*from USERS where name=E1.

The decryption unit 112 may be implemented as circuitry and/or logic and/or software and uses the client encryption key to decrypt encrypted data received from the secure database platform 130, in cases where the received data has been encrypted by the secure hardware unit 160. For example, the encrypted data received from the secure database platform 130 may be encrypted database records that satisfy the query. In some implementations, the keys for encrypting queries and decrypting responses may be different, as long as both keys are provisioned in the secure hardware unit 160. The decrypted data may be further processed by the database client 110 or another data processing device or system.

The network 120 may be wired or wireless or a combination of both. The network 120 can include, for example, a wireless cellular network, a wireless local area network (WLAN) or Wi-Fi network, a Third Generation (3G) or Fourth Generation (4G) mobile telecommunications network, a wired Ethernet network, a private network such as an intranet, a public network such as the Internet, or any appropriate combination of networks.

The secure database platform 130 includes a database management system 140, one or more database files 150, and a secure hardware unit 160. In general, the secure database platform 130 provides a database platform where the database management system 140 cannot access the content of the encrypted input data sent from the database client 110 to perform a database operation; nor can it access any decrypted data stored within the database file(s). Instead, the database management system 140 sends the encrypted input data and an identification of the client encryption key to the secure hardware unit 160. The secure hardware unit 160 then retrieves the client encryption key from an internal key store 172 and uses the client encryption key to decrypt the encrypted input data for processing.

In general, the database management system 140 is configured to run database software. The database management system 140 receives, from database clients including the database client 110, requests to perform database operations that are supported by the database software. The database software may be implemented based on an existing database product, e.g., MYSQL™, or POSTGRESSQL™, where the database software may support a subset or all of the database operations supported by the existing database product. Alternatively, the database software may be a proprietary database product, where the database software may support proprietary database operations that have a different format from existing database products.

Based on the received database operations, the database management system 140 determines one or more data operations for the secure hardware unit 160 to perform. The secure hardware unit 160 includes circuitry and/or logic and/or software that enables hardware-based cryptographic processing in the secure database platform 130, where the data stored in the secure hardware unit 160 is secured from external software attacks and physical theft. For example, the secure hardware unit 160 may be implemented based on an augmented version of the Trusted Platform Module (TPM) standard or another suitable hardware-based solution for implementing a crypto-processor, such as the ASUS™ Trusted Platform Module 3.19. In some implementations, the secure hardware unit 160 may be integrated with the database management system 140. For example, a TPM device may be affixed to the motherboard of the database management system 140, or embedded within the main CPU. In some other implementations, the secure hardware unit 160 may be implemented on a device that is separated from the database management system 140.

The secure hardware unit 160 includes a computing unit 162, an encryption unit 164, a decryption unit 166, and a memory 170. The computing unit 162 includes circuitry and/or logic and/or software that supports a set of data operations that may be performed on decrypted data. For example, the computing unit 162 may be configured to perform relational operations, e.g., determining whether two decrypted input values are greater than, equal to, or less than one another. As another example, the computing unit 162 may be configured to perform arithmetic operations, e.g., performing addition, subtraction, multiplication, or division of two decrypted input values. As another example, the computing unit 162 may be configured to apply a hash function to a decrypted input value to generate a hash value. As another example, the computing unit 162 may be configured to compute an average/median of two or more passed-in encrypted values and return an encrypted result. As another example, the computing unit 162 may be configured to apply a passed-in, encrypted regular expression to another passed-in encrypted value and return an indication of whether there has been a match. As another example, given a provided value encrypted with a first key K1, the computing unit 162 may be configured to decrypt an input value using the first key K1 to obtain a plaintext value, and then to salt and re-encrypt the plaintext value with a second key K2. The computing unit 162 may then provide the re-encrypted data as output data.

The decryption unit 166 may be implemented using suitable circuitry and/or logic and/or software to use an encryption key stored in the key store 172 to decrypt an encrypted data value. The encryption unit 164 may be implemented using suitable circuitry and/or logic and/or software to use an encryption key stored in the key store 172 to encrypt a data value.

The memory 170 may be any suitable type of non-volatile memory device that is configured to prevent an external software or hardware tap. For example, the memory 170 may be protected by a tamper-resistant circuitry that would prevent a memory read or write without a proper hardware authentication. The memory 170 includes a key store 172 configured to store encryption keys for encrypting and decrypting data.

The database 150 may be any suitable data storage device or system that stores a collection of encrypted data. In general, the content of the data stored in the database 150 is encrypted and not accessible to the database management system 140. The database management system 140 performs operations on the data stored in the database 150 by providing to the secure hardware unit 160 the encrypted data and an identification of the encryption key used to encrypt the data. The secure hardware unit 160 is configured to decrypt and process the encrypted data and then return either an encrypted or unencrypted result, depending on the nature of the operation.

FIG. 1A also illustrates an example flow of data for adding a record to the secure database platform 130, shown in stages (A) to (G). Stages (A) to (G) may occur in the illustrated sequence, or they may occur in a suitable sequence that is different than in the illustrated sequence. During stage (A), the key store 172 is provisioned with encryption keys including a client encryption key K1 for encrypting and decrypting data from the database client 110, and a system encryption key K2 for encrypting and decrypting data stored in the database 150. In some implementations, the client encryption key and the system encryption key may be the same. In some other implementations, the client encryption key and the system encryption key may be different keys. In some implementations, there may be multiple database clients that are connected to the secure database platform 130, and a unique encryption key may be assigned to each database client 110. The provisioning of the encryption keys may use a secure protocol to ensure the encryption keys are not visible to an attacker during the provisioning process. For example, provided with a public key of a client, the secure hardware unit 160 may securely generate a new query encryption key and then encrypt it using the provided public key. The key can then be sent to the client without fear of tampering, and the client can use their associated private key to decrypt the client key. This ensures that the client key is only known to the secure element and the client.

During stage (B), the database client 110 adds a record "RECORD1" having a value "Bob" for the field "NAME" to a table "Users" in the database 150 by generating a query:

ADD RECORD1 to USERS where name="Bob".

The encryption unit 112 encrypts the data value "Bob" with the client encryption key K1 to generate encrypted data EV1 (e.g., a 128-bit number), possibly salting V1 prior to encrypting it to ensure that the same value V1 results in multiple encrypted payloads to prevent statistical inference of the original data set through observation of large amounts of encrypted traffic. The database client 110 then provides the encrypted query to the database management system 140:

ADD RECORD1 to USERS where name=EV1.

During stage (C), the database management system 140 receives the revised query, and instructs the secure hardware unit 160 to decrypt the encrypted data. In this example, the database management system 140 sends a command to the secure hardware unit 160 to re-encrypt the value EV1 with a system encryption key K2, where the command includes the encrypted value EV1, an identifier for (i.e., data identifying) the client encryption key K1, and an identifier for the system encryption key K2. In some implementations, the identifier for the client encryption key K1 may be provided by the database client 110. In some other implementations, the identifier for the client encryption key K1 may be derived by the database management system 140 using other data. For example, the database management system 140 may derive the identifier for the client encryption key K1 based on user login information of the database client 110. As another example, the database management system 140 may derive the identifier for the client encryption key K1 based on an IP address of the database client 110.

During stage (D), the decryption unit 166 retrieves the client encryption key K1 from the key store 172 based on the identifier for the client encryption key K1 provided by the database management system 140. In some implementations, the identifier for the client encryption key K1 may indicate a memory location of the client encryption key K1 in the key store 172. In some other implementations, the identifier for the client encryption key K1 may indicate a seed value that may be used by the decryption unit 166 to derive, using a predetermined algorithm, a memory location of the client encryption key K1 in the key store 172. After the decryption unit 166 retrieves the client encryption key K1, the decryption unit 166 decrypts the encrypted data value EV1 to derive the decrypted data value "Bob". Note that the decrypted data value "Bob" is stored within the secure hardware unit 160 and not accessible by the database management system 140.

During stage (E), the encryption unit 164 re-encrypt the decrypted value "Bob" using the system encryption key K2. The encryption unit 164 retrieves the system encryption key K2 from the key store 172 based on the identifier for the system encryption key K2 provided by the database management system 140. After the encryption unit 164 retrieves the system encryption key K2, the encryption unit 164 encrypts the decrypted data value "Bob" to derive the encrypted data value EV2 (e.g., another 128-bit number that is different from EV1).

During stage (F), the secure hardware unit 160 provides the encrypted data value EV2 to the database management system 140. During stage (G), the database management system 140 adds a new record "RECORD1" with a data value of EV for the field "NAME" to the table "USERS" in the database 150. Under this scheme, if there are multiple database management systems in the secure database platform 130, each database management system may be assigned with a unique system encryption key, which adds additional security for cloud-based database services where multiple service providers may be running services on the same database platform. The salting processing adds additional security to the data, but is not required. For example, in response to receiving the ADD operation from the database client 110, the database management system 140 may add a new record "RECORD1" with a data value of EV1 for the field "NAME" to the table "USERS" in the database 150 without performing the salting process as described in stages (E) to (G).

In some implementations, a hash-table-based index may be used to index a particular table in the database. For example, after the decryption unit 166 decrypts the encrypted data using the client encryption key K1, the computing unit 162 may compute a SHA256 (Secure Hash Algorithm) digest on the decrypted value, and then return the SHA256 digest back to the database management system 140 for use in finding a bucket in the index's hash table. Under this approach, the database management system 140 may index the records while maintaining security for the data stored in the database 150.

Or, for example, the records in the table "USERS" may be indexed using a B-tree index.

Figure 1B:
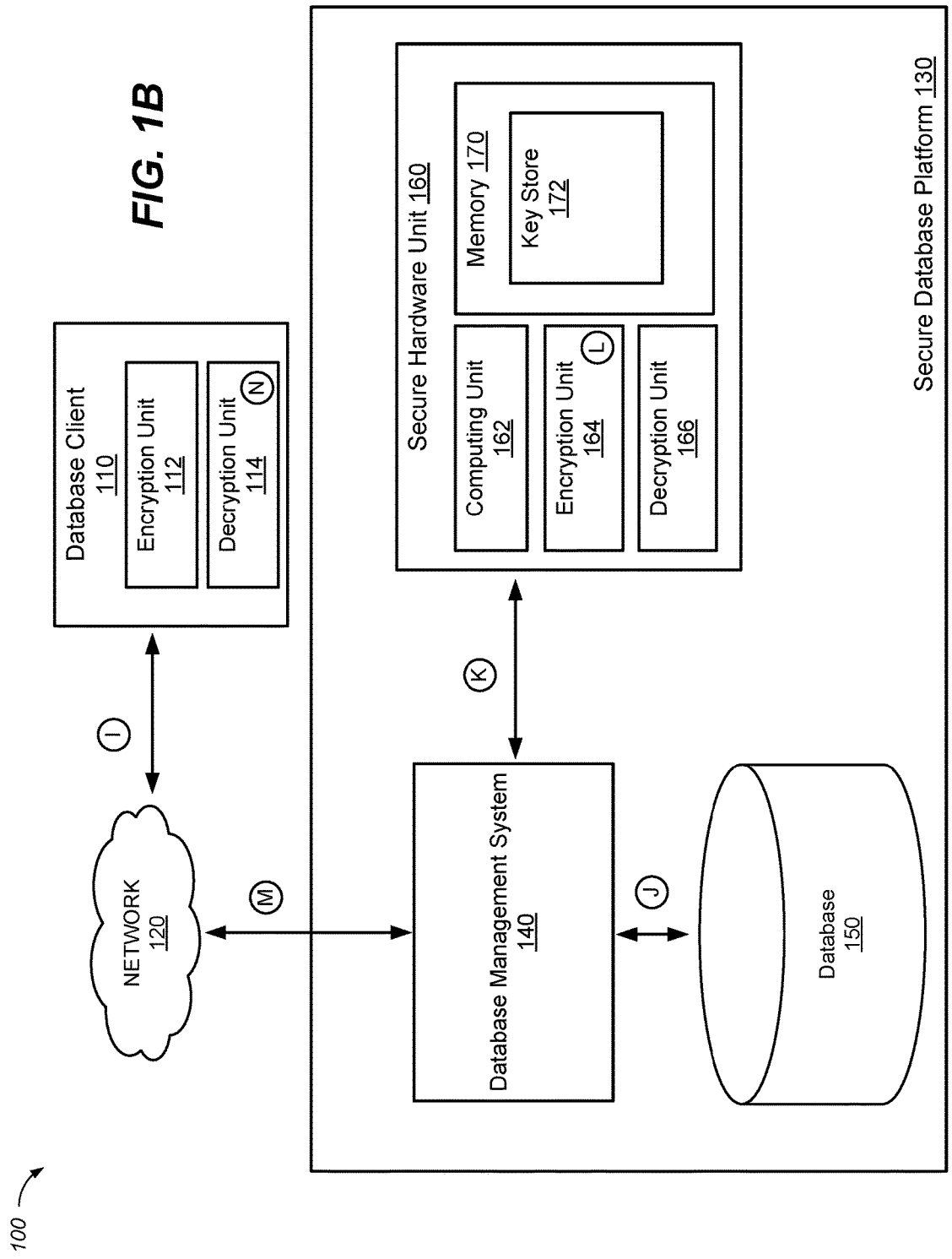

FIG. 1B illustrates an example flow of data for retrieving records from the database secure database platform 130, shown in stages (I) to (N). Stages (I) to (N) may occur in the illustrated sequence, or they may occur in a suitable sequence that is different than in the illustrated sequence.

During stage (I), the database client 110 submits a query to retrieve records having a value "David" for the field "NAME" in the table "USERS" in the database 150 by generating a query:

SELECT*from USERS where name="David".

The encryption unit 112 encrypts the data value "David" with the client encryption key K1 to generate encrypted data EV3. The database client 110 then provides the encrypted query to the database management system 140:

SELECT*from USERS where name=EV3.

During stage (J), the database management system 140 receives the encrypted query, and retrieves records from the table "USERS" stored in the database 150. In this example, the records from the table "USERS" have been encrypted by the system encryption key K2, and the database uses a BTREE index whose index keys are also encrypted with K2.

During stage (K), the database management system 140 issues commands to the secure hardware unit 160 to compare the index keys within each BTREE node with the decrypted query term. In this example, the database management system 140 may issue the following command to the secure hardware unit 160:

Operation: Compare

Operand1: {EV3, UIDK1}

Operand2: {encryptedData[1 . . . N], UIDK2}, where UIDK1 is the identifier for the client encryption key K1, UIDK2 is the identifier for the system encryption key K2, and encryptedData[1 . . . N] is the corresponding encrypted index key values found in a given BTREE node for the table "USERS".

In this example, the decryption unit 166 retrieves the client encryption key K1 from the key store 172 based on the identifier UIDK1 provided by the database management system 140. After the decryption unit 166 retrieves the client encryption key K1, the decryption unit 166 decrypts the encrypted data value EV3 to derive the decrypted data value V3 (i.e., "David"). Note that the decrypted data value "David" is stored within the secure hardware unit 160 and not accessible by the database management system 140.

The decryption unit 166 further retrieves the system encryption key K2 from the key store 172 based on the identifier UIDK2 provided by the database management system 140. After the decryption unit 166 retrieves the system encryption key K2, the decryption unit 166 decrypts the encrypted data values encryptedData[1 . . . N] to derive the decrypted data values V4[1 . . . N] for the respective BTREE node.

The computing unit 162 then performs a compare operation to determine whether the data values V3 and V4[1 . . . N] are equal to each other. In this example, assuming N (an integer) records stored in the B-TREE index, the database 150 may extract each of N encrypted data (each encrypted with K2) from the root block and nodes of the B-TREE and pass all of them to the secure hardware unit 160 for a comparison with the query term as described above. The database software running on the database management system 140 may use the results from these N comparisons to decide whether any of the records in the root block of the B-TREE matched the query term, or whether the database software should traverse to one of the N children of the BTREE's root block because the query term falls in between the root keys in the tree. The search can then proceed with reading of the next block in the B-TREE, along with comparisons of its various index keys with the search term, all using the secure hardware unit 160 to hide the identity of the original plaintext data and the index's data.

During stage (L), once the database management system 140 identifies the matching records, the database management system 140 sends the matching records to the secure hardware unit 160 to decrypt the matching records with the system encryption key K2 and then re-encrypt the matching records with the client encryption key K1.

During stage (M), the database management system 140 sends the encrypted matching records to the database client 110. During stage (N), the decryption unit 114 decrypts the matching encrypted matching records using the client encryption key K1. The database client 110 then may further process the decrypted records.

Although not shown in FIG. 1A or FIG. 1B, in another example, a hash-table-based index may be used to index a particular table in the database. Here, the database management system 140 may pass in the encrypted query value (e.g., EV3, UIDK1) to the secure hardware unit 160. The secure hardware unit 160 may then decrypt the query value with K1 as described above, and compute a SHA256 digest on the decrypted value. The secure hardware unit 160 may then return the SHA256 digest to the database management system 140 for use in finding a bucket in the index's hash table. Traversal through the nodes within the bucket can then proceed as described in reference to FIG. 1B. If and when the secure hardware unit 160 returns a value of "equal", the database management system 140 determines that a record in the hash-based index has been found. Note that the decrypted data is not exposed to the database management system 140 at any time during the process.

Although not shown in FIG. 1A or FIG. 1B, in another example, an arithmetic operation may be performed as part of processing a query. For example, the database client 110 may generate a query to find records in the table "USERS" that match the name "Bob", and to compute a sum of salary and bonus for these matching records:

SELECT salary+bonus from USERS where
        name="Bob".

Similar to the descriptions above with reference to FIG. 1A and FIG. 1B, the encrypted query would become:

SELECT salary+bonus from USERS where
        name=EV1.

Here, the database management system 140 may identify the matching records as described in reference to FIG. 1B, and the database management system 140 may retrieve the encrypted salary and bonus field values, where both were encrypted by the system encryption key K2. The database management system 140 may issue a command to the secure hardware unit 160 to decrypt the encrypted salary and bonus field values, and to add the two decrypted values. The encryption unit 164 then encrypts the sum using the client encryption key K1, and the encrypted sum is sent back to the client in an encrypted form. Note that the decrypted data is not exposed to the database management system 140 at any time during the process.

Figure 2:
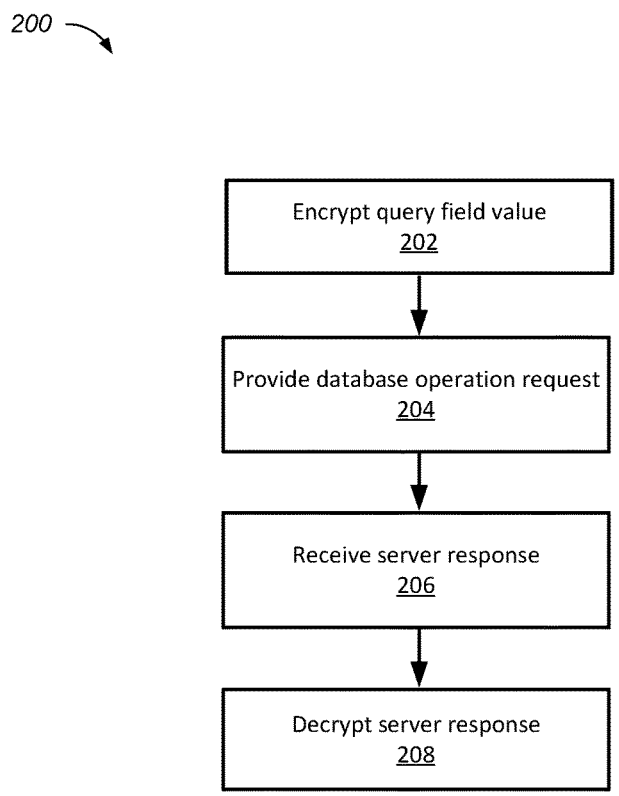
FIG. 2 is a flow diagram that illustrates an example of a process for performing a database operation.

FIG. 2 is a flowchart of an example process 200 for performing a database operation by a database client. The process 200 may be performed by a system such as the database client 110.

The system encrypts one or more query field values (202). For example, referring to FIG. 1B, the encryption unit 112 of the database client 110 may encrypt the data value "David" with the client encryption key K1 to generate encrypted data EV3.

The system provides a database operation request to a database management system (204). For example, referring to FIG. 1B, the database client 110 may provide the encrypted query to the database management system 140:

SELECT*from USERS where name=EV3.

The system receives a response from the database management system (206). For example, referring to FIG. 1B, the database management system 140 may send the encrypted matching records to the database client 110, where each matching record has been encrypted using the client encryption key K1.

The client system decrypts the response from the database management system (208). For example, referring to FIG. 1B, the decryption unit 114 of the database client 110 may decrypt the matching encrypted matching records using the client encryption key K1.

Figure 3:
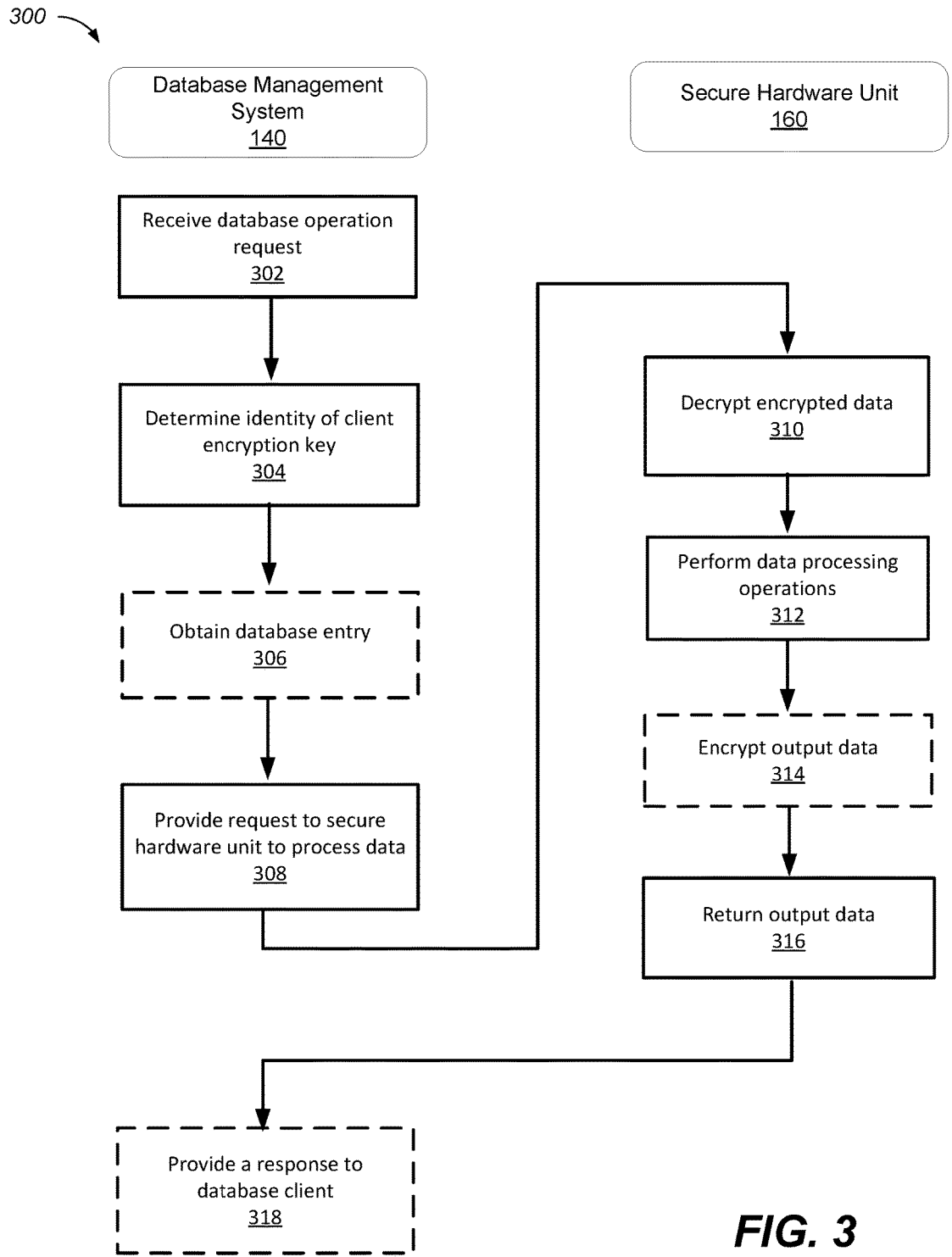
FIG. 3 is a flow diagram that illustrates an example of a process for processing a database operation.

FIG. 3 is a flowchart of an example process 300 for processing a database operation by a database client. The process 300 may be performed by a system such as the secure database platform 130.

The system receives a client request to perform a database operation using first encrypted data as an encrypted value of a field to be operated on by the database operation, where the first encrypted data has been encrypted by a database client using a first encryption key (302). For example, referring to FIG. 1B, the database management system 140 may receive the encrypted query from the database client 110, where the data value for the "name" field has been encrypted using a client encryption key K1.

The database management system determines that the first encrypted data has been encrypted using the first encryption key (304). For example, in some implementations, the identifier for the client encryption key K1 may be provided by the database client 110. In some other implementations, the identifier for the client encryption key K1 may be derived by the database management system 140 using other data.

In response to determining that the first encrypted data has been encrypted using the first encryption key, the system provides, to a secure hardware unit, a system request for performing one or more data processing operations, the server request including (i) the first encrypted data and (ii) data identifying the first encryption key (308). For example, referring to FIG. 1B, the database management system 140 may issue commands to the secure hardware unit 160 to compare the decrypted records with the decrypted query term. The database management system 140 may issue the following commands to the secure hardware unit 160 for each comparison:

Operation: Compare

Operand1: {EV3, UIDK1}

Operand2: {encryptedData[i], UIDK2}, where UIDK1 is the identifier for the client encryption key K1, UIDK2 is the identifier for the system encryption key K2, and encryptedData[i] is the corresponding encrypted value for the field "name" in the i-th record of the table "USERS".

In some implementations, the system may determine that the database operation requires accessing one or more database entries in the database. In response to determining that the database operation requires accessing one or more database entries in the database, the system may obtain one or more database entries based on the database operation (306). For example, referring to FIG. 1B, the database management system 140 may receive the encrypted query. Based on receiving the query, the database management system 140 may determine that the query operation requires accessing one or more database records in the database 150. In some implementations, the one or more database entries may include second encrypted data that has been encrypted using a second encryption key, where the system request further includes (iii) the second encrypted data and (iv) data identifying the second encryption key. For example, the records from the table "USERS" stored in the database 150 may have been encrypted using a system encryption key K2.

The system decrypts the encrypted data (310). For example, referring to FIG. 1B, the decryption unit 166 of the secure hardware unit 160 may retrieve the client encryption key K1 from the key store 172 based on the identifier UIDK1 provided by the database management system 140. After the decryption unit 166 retrieves the client encryption key K1, the decryption unit 166 decrypts the encrypted data value EV3 to derive the decrypted data value V3 (i.e., "David").

The system performs one or more data processing operations on the decrypted data (312). For example, referring to FIG. 1B, the computing unit 162 of the secure hardware unit 160 may perform a compare operation to determine whether the decrypted values V3 and V4 are equal to each other.

In some implementations, the system may encrypt the output data (314). For example, referring to FIG. 1B, once the database management system 140 identifies the matching records, the database management system 140 may send the matching records to the secure hardware unit 160 to decrypt the matching records with the system encryption key K2 and then re-encrypt the matching records with the client encryption key K1. In some other implementations, the system may not encrypt the output data. For example, if the secure hardware unit 160 performs a Boolean operation or a hash function, the secure hardware unit 160 may send to the database management system 140 a Boolean value indicating the result of a comparison operation, or a hash value from the hash function.

The system returns the output data to the database management system (316). For example, referring to FIG. 1B, after the secure hardware unit 160 re-encrypts the matching records with the client encryption key K1, the secure hardware unit 160 may return the re-encrypted data to the database management system 140.

In some implementations, the system may provide a response to the database client (318). For example, referring to FIG. 1B, the database management system 140 may send the encrypted matching records to the database client 110. In some implementations, the response may be unencrypted. For example, referring to FIG. 1A, after a record has been successfully added to the database 150, the database management system 140 may send an unencrypted response to the database client 110 indicating that the record has been successfully added to the database 150.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
   a secure hardware unit; and
   a database system comprising:
      one or more processors; and
      a computer-readable medium having stored thereon instructions that, when executed by the one or more processors, cause the one or more processors to perform operations comprising:
         receiving, from a database client, a client request to perform a database operation using first encrypted data as an encrypted value of a field of a database to be operated on by the database operation, wherein the first encrypted data has been encrypted by the database client using a first encryption key;
         providing, to the secure hardware unit, a system request for performing one or more data processing operations corresponding to the database operation, the system request including (i) the first encrypted data, (ii) data identifying the first encryption key, (iii) one or more database entries including second encrypted data that has been encrypted using a second encryption key, and (iv) data identifying the second encryption key, wherein the secure hardware unit:
            decrypts the first encrypted data using the first encryption key to generate first decrypted data and decrypts the second data using the second encryption key to generate second decrypted data;
            generates output data by performing the one or more data processing operations on at least one database entry having a decrypted value of the field that matches the first decrypted data; and
            provides the output data to the database system; and
         receiving, from the secure hardware unit and by the database system, the output data representing an output of the one or more data processing operations.

2. The system of claim 1, wherein the operations further comprise:
   determining that the database operation requires accessing the one or more database entries in the database; and
   obtaining, from the database, the one or more database entries including the second encrypted data that has been encrypted using a second encryption key in response to determining that the database operation requires accessing the one or more database entries in the database.

3. The system of claim 2, wherein the first encryption key and the second encryption key are the same encryption key.

4. The system of claim 2, wherein the first encryption key and the second encryption key are different encryption keys.

5. The system of claim 1, wherein the secure hardware unit includes:
   a key store that stores multiple encryption keys including the first encryption key; and
   circuitry or software to perform operations comprising:
      obtaining the first encryption key based on the data identifying the first encryption key.

6. The system of claim 1, wherein the operations further comprise:
   providing a response including the output data representing the output of the one or more data processing operations to the database client.

7. The system of claim 1, wherein providing, to the secure hardware unit, the system request for performing the one or more data processing operations further comprises:
   determining that the first encrypted data has been encrypted using the first encryption key; and
   in response to determining that the first encrypted data has been encrypted using the first encryption key, providing, to the secure hardware unit, the system request for performing the one or more data processing operations.

8. The system of claim 1, wherein the secure hardware unit is a trusted platform module that is integrated with the one or more processors of the database system on a common board.

9. The system of claim 1, wherein the secure hardware unit is integrated directly alongside a main processor of the database system.

10. A computer-implemented method, comprising:
receiving, by a database system and from a database client, a client request to perform a database operation using first encrypted data as an encrypted value of a field of a database to be operated on by the database operation, wherein the first encrypted data has been encrypted by the database client using a first encryption key;
providing, by the database system and to a secure hardware unit, a system request for performing one or more data processing operations corresponding to the database operation, the system request including (i) the first encrypted data, (ii) data identifying the first encryption key, (iii) one or more database entries including second encrypted data that has been encrypted using a second encryption key, and (iv) data identifying the second encryption key, wherein the secure hardware unit:
decrypts the first encrypted data using the first encryption key to generate first decrypted data and decrypts the second data using the second encryption key to generate second decrypted data;
generates output data by performing the one or more data processing operations on at least one database entry having a decrypted value of the field that matches the first decrypted data; and
provides the output data to the database system; and
receiving, from the secure hardware unit and by the database system, the output data representing an output of the one or more data processing operations.

11. The computer-implemented method of claim 10, further comprising:
determining that the database operation requires accessing the one or more database entries in the database; and
in response to determining that the database operation requires accessing one or more database entries in the database, obtaining, by the database system and from the database, the one or more database entries including second encrypted data that has been encrypted using a second encryption key.

12. The computer-implemented method of claim 11, wherein the first encryption key and the second encryption key are the same encryption key.

13. The computer-implemented method of claim 11, wherein the first encryption key and the second encryption key are different encryption keys.

14. The computer-implemented method of claim 10, wherein the data identifying the first encryption key identifies a memory location in the secure hardware unit that stores the first encryption key.

15. The computer-implemented method of claim 10, further comprising:
performing one or more additional data processing operations on the output data to complete the database operation.

16. The computer-implemented method of claim 10, further comprising:
providing, from the database system to the database client, a response indicating a completion of the database operation.

17. The computer-implemented method of claim 10, wherein the output data has been encrypted by the secure hardware unit using the first encryption key.

18. A computer-readable medium having stored thereon instructions that, when executed by the one or more computers, cause the one or more computers to perform operations comprising:
receiving, by a database system and from a database client, a client request to perform a database operation using first encrypted data as an encrypted value of a field of a database to be operated on by the database operation, wherein the first encrypted data has been encrypted by the database client using a first encryption key;
providing, by the database system to a secure hardware unit, a system request for performing one or more data processing operations corresponding to the database operation, the system request including (i) the first encrypted data, (ii) data identifying the first encryption key, (iii) one or more database entries including second encrypted data that has been encrypted using a second encryption key, and (iv) data identifying the second encryption key, wherein the secure hardware unit:
decrypts the first encrypted data using the first encryption key to generate first decrypted data and decrypts the second data using the second encryption key to generate second decrypted data;
generates output data by performing the one or more data processing operations on at least one database entry having a decrypted value of the field that matches the first decrypted data; and
provides the output data to the database system; and
receiving, from the secure hardware unit and by the database system, the output data representing an output of the one or more data processing operations.

19. The computer-readable medium of claim 18, wherein the operations further comprise:
determining that the database operation requires accessing the one or more database entries in the database; and
in response to determining that the database operation requires accessing one or more database entries in the database, obtaining, by the database system from the database, the one or more database entries including second encrypted data that has been encrypted using a second encryption key.

* * * * *